(No Model.) 2 Sheets—Sheet 1.
G. F. PACKARD.
ELECTRIC METER FOR ALTERNATING CURRENTS.
No. 574,565. Patented Jan. 5, 1897.
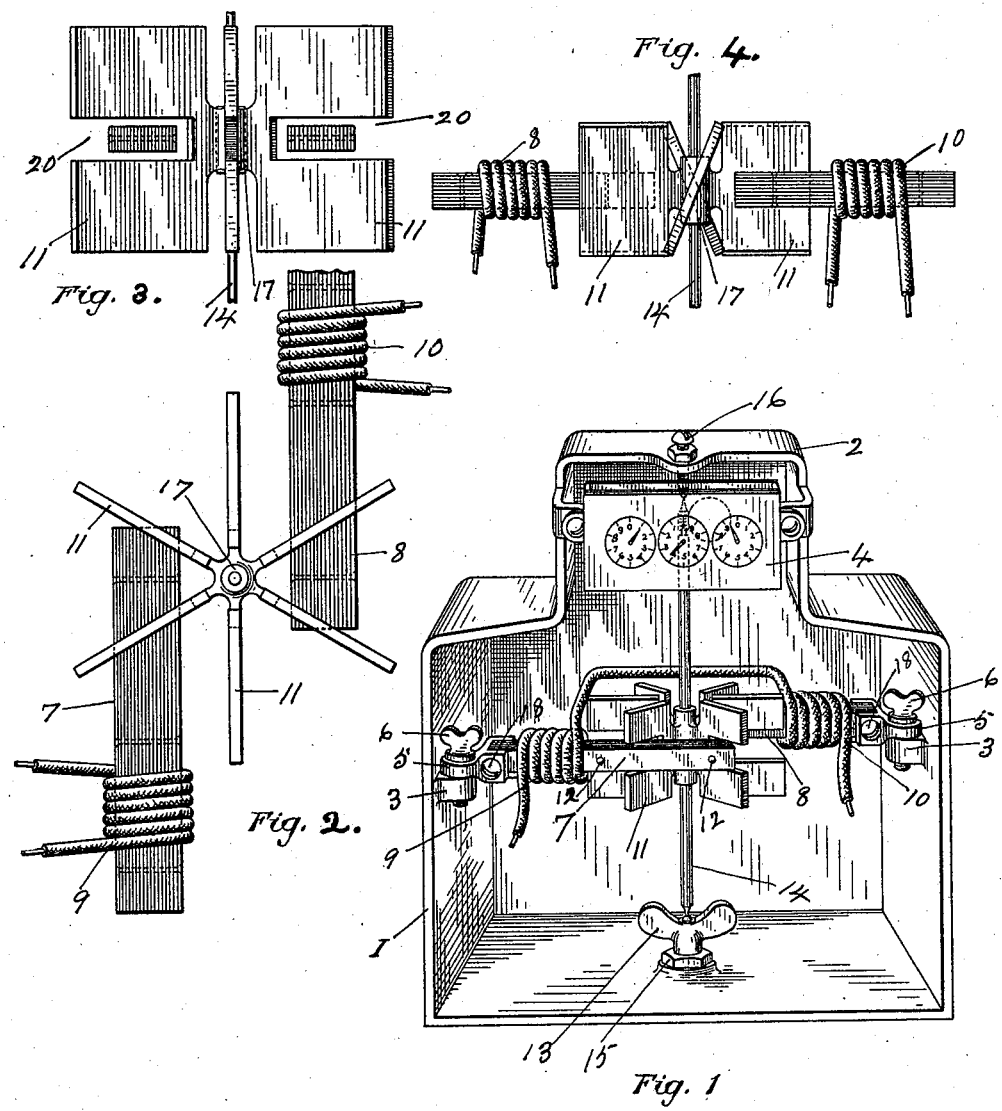

(No Model.) 2 Sheets—Sheet 2.
G. F. PACKARD.
ELECTRIC METER FOR ALTERNATING CURRENTS.
No. 574,565. Patented Jan. 5, 1897.

UNITED STATES PATENT OFFICE.

GRANVILLE FREDERICK PACKARD, OF FORT WAYNE, INDIANA.

ELECTRIC METER FOR ALTERNATING CURRENTS.

SPECIFICATION forming part of Letters Patent No. 574,565, dated January 5, 1897.

Application filed October 26, 1896. Serial No. 610,050. (No model.)

*To all whom it may concern:*

Be it known that I, GRANVILLE FREDERICK PACKARD, a citizen of the United States, residing at Fort Wayne, in the county of Allen, in the State of Indiana, have invented certain new and useful Improvements in Electric Meters for Alternating Currents; and I do hereby declare that the following is a full, clear, and exact description of the invention, which will enable others skilled in the art to which it appertains to make and use the same, reference being had to the accompanying drawings, which form part of this specification.

My invention relates to improvements in electric meters for measuring the energy consumed in alternating, pulsating, or intermittent electric currents.

The object of my invention is to provide a simple, economical, efficient, and reliable meter having the fewest possible number of parts for measuring automatically the electric current or energy consumed in a system for the general distribution of electricity for light, heat, and power without the employment of commutators, mercury-contacts, or other current-rectifying devices.

My improved meter for alternating currents is based upon the principle of eddy-current repulsion and operates as though a fluid substance was escaping from the poles and beating upon the fan-blades, thereby producing rotation of the armature.

My improvement comprises one or more electromagnets in inductive relation to a revoluble armature, the exciting-coils being connected in the work-circuit, through which passes the current to be measured, a rotatable metallic armature provided with radially-arranged retarding-vanes and rotated by the repellent action of the eddy-currents set up by the magnetic blast of the said electromagnets, and a registering-train so connected with said armature as to indicate the number of ampere hours of current consumed in the circuit to which the meter is applied.

The principal novel feature of my invention consists in the construction of my improved armature, by which I obviate the necessity of providing a separate damping or retarding device.

Figure 10:
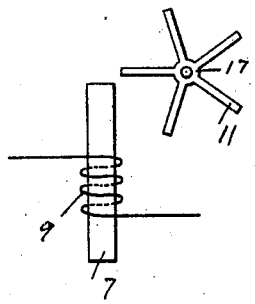
Figure 9:
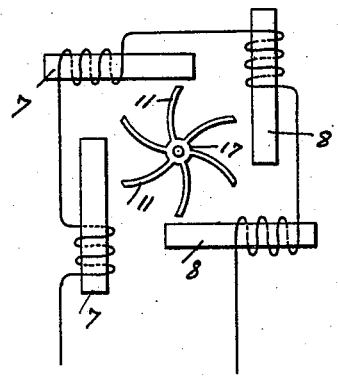

Referring now to the drawings, in which similar reference-numerals indicate corresponding parts throughout the several views, Figure 1 is a perspective view of the preferred commercial form of my improved meter mounted in a proper containing-case and showing the relative arrangement of the operative parts. Fig. 2 is a plan of my improved armature in inductive relation to the adjacent poles of the electromagnets. Fig. 3 is a view in elevation of the same with the inducing-coils removed and showing the arrangement of the laminated cores within the horizontal slots of the armature-vanes. Fig. 4 is an elevation showing a modified form of the armature, the vanes thereof being tilted for the purpose described. Figs. 5, 6, 7, and 8 illustrate modified forms and arrangements of my improvement. Figs. 9 and 10 are diagrammatic views of the same.

The energizing field-coils 9 and 10 are connected in the main source of supply feeding the lamps or motors whose consumption of energy it is desired to measure, inside of which are placed iron cores 7 and 8, respectively, Figs. 1 and 2, which cores may be arranged at any desired angle to the axis of the containing-coil, as seen in the drawings. The said cores 7 and 8 are identical in form, dimensions, and construction, have their plates or laminæ rigidly secured together by proper rivets 12, Fig. 1, preferably three in number for each core, or other suitable manner. The said cores are horizontally arranged and in approximately parallel relation, Fig. 2, have their outer ends fixed in a clamp 5 by means of a proper holding-screw 18. The said clamp 5 is swiveled on the thumb-screw 6, which is mounted in a proper vertical screw-threaded opening in the lug 3, which is cast with or fixed upon the opposite sides of the said case 1, Fig. 1, thus providing for a convenient lateral adjustment of said cores.

The containing-case 1, of suitable material, preferably metal, may be of any proper form and may have an upright extension adapted to contain the dial 4 and its accompanying registering-train, as seen in Fig. 1. At or near the center of the base of said case is arranged a jeweled thumb-screw 13, adapted to form a proper bearing for the pointed lower end of the upright shaft 14 and is seated upon a proper lock-nut 15 and affords a means for vertically adjusting the said shaft. In the top of said case 1 is properly secured a vertical screw 16, Fig. 1, having its lower end centrally drilled to receive and form a suitable bearing for the pointed upper end of said shaft 14. In these two bearings, arranged in vertical alinement, the said shaft 14 is revolubly mounted and connects with a train of wheels communicating motion to a suitable counting mechanism. The armature, of aluminium or other good electric conducting material, rigidly mounted upon the said shaft 14 by a set-screw or other proper manner, coincident with its axis and in proper inductive relation to said magnetizing or energizing source, has a central hub 17 and a plurality of radial vanes 11, preferably provided midway their upper and lower ends with an open transverse slot 20, adapted to receive the inner projecting free ends of the said cores 7 and 8, as shown in Figs. 1, 2, and 3. The said blades are preferably though not necessarily integral with the said hub. As the resistance offered by the air to the rotation of said vanes affords the required retardation, my improved armature obviates the necessity for a separate retarding device.

While the form and relative arrangement of my invention is that shown in Figs. 1, 2, and 3, it may be variously modified without departing from the spirit and scope of my invention. For example, the said blades 11 may be arranged in a tilted or inclined position upon the supporting hub or arms, as shown in Fig. 4, in such a manner that the impact of the magnetic lines produces a slight lifting effect which tends to diminish or overcome the inertia in starting minimum loads. The said armature-blades may also be bent or curved in the direction of rotation to increase the windage or damping effect in a well-understood manner, as seen in Fig. 9.

Figure 7:
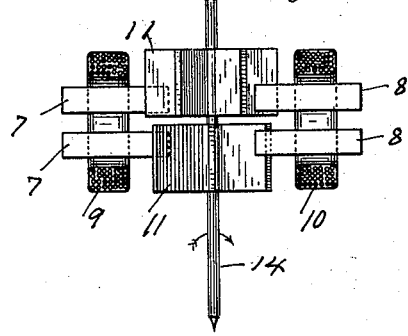

When it is desired to increase the torque or turning moment, two of my improved armatures may be fixed in vertical alinement upon the said shaft 14, as shown in Fig. 7, with their respective blades arranged, preferably, out of vertical alinement.

Figure 8:
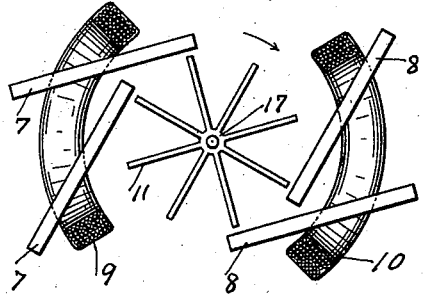
Figure 5:
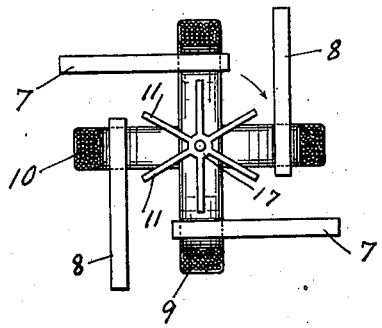
Figure 6:
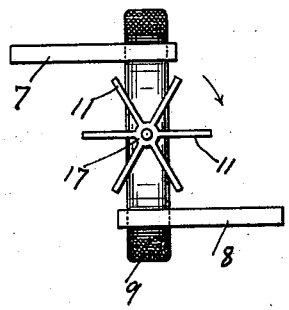

Another obvious modification is the arrangement of a plurality of magnets in series, whose cores are approximately tangential to the arc of rotation of the armature-blades, as shown in Figs. 5 and 8 and diagrammatically in Fig. 9. It is obvious that the torque will be practically in proportion to the number of magnets employed. When a plurality of magnets are employed, said cores 7 and 8 may be arranged as shown in Figs. 5 and 8, a plurality of cores in each coil and the said cores arranged tangentially to the arc described by the blades of the rotary armature.

The operation of my improved meter thus described is obvious and, briefly stated, is as follows: The rotation of my improved armature is produced by eddy-current repulsion, the magnetic field acting upon the blades thereof like an escaping fluid, taking the same direction as that of the lines of force of the magnetic field in which the said armature is arranged, as shown diagrammatically in the simplest form in Fig. 10, in which the armature-blades are acted upon or bombarded by the lines of force. This is true because the relation of the armature-blades to the adjacent poles is such that a large portion of the magnetic flux is intercepted by said blades successively in a very efficient manner, since, as shown, the planes of said blades are nearly at right angles to the normal path of the magnetic flux. Thus the speed of rotation of the said armature is proportional to the amount of current in the circuit.

Having thus described my invention and the manner in which the same is employed, what I desire to secure by Letters Patent is—

1. In an electric meter, the combination of a rotary armature provided with radial vanes for the purpose specified the said armature being adapted to be rotated by the mutually repellent action of the inducing and eddy-current fields, said inducing fields being established by the adjacent poles of one or more electromagnets; an energizing coil or coils forming the winding for and exciting said magnets when traversed by alternating electric currents; and a registering train or indicating device actuated by the movements of the armature, all substantially as described.

2. In an electric meter or motive device an energizing coil or coils or field of force in combination with a rotary armature provided with a plurality of radial vanes or damping devices so arranged in inductive relation to said field as to be successively repelled therefrom, and a counting or registering train connected with said armature, all substantially as described.

3. The combination in an electric meter or motive device of one or more rotatable armatures each having radial retarding-vanes upon which are brought to bear the inducing field or fields of one or more electromagnets for the purpose of generating eddy-currents upon and repelling said vanes, and a registering-train or indicating device actuated by the movements of said armature, all substantially as described.

4. In an electric meter or motive device a rotary armature arranged in inductive relation to an energizing field of force as shown, and provided with a plurality of radial retarding devices so arranged relative to said field as to have induced upon their surfaces eddy or vortex currents whose field is opposed or repelled by the inducing-field, thereby producing rotation.

5. In an alternating-electric-current meter, the combination of a rotary armature having a series of radial damping or retarding vanes arranged in inductive relation to an energizing field of force, as described; a main circuit coil or coils traversed by the current to be measured and embracing a plurality of laminated cores, as shown, having their inner ends approximately tangential to the arc of rotation of said vanes whereby the said armature will be rotated by the magnetic blast emanating therefrom and threading the plane of said vanes; and a counting or indicating device connected with and actuated by said armature, all substantially as described.

Signed by me, at Fort Wayne, Allen county, State of Indiana, this 24th day of September, A. D. 1896.

G. FREDERICK PACKARD.

Witnesses:
 IDA L. ROSS-LEWIN,
 N. WEBSTER SCHLATER.